United States Patent
Edstrom

[15] 3,636,269

[45] Jan. 18, 1972

[54] ARRANGEMENT FOR VOICE-FREQUENCY SIGNALLING IN TELEPHONE SYSTEMS

[72] Inventor: Nils Herbert Edstrom, Vallingby, Sweden

[73] Assignee: Telefonaktiebolaget LM Ericsson, Stockholm, Sweden

[22] Filed: Oct. 10, 1969

[21] Appl. No.: 865,279

[30] Foreign Application Priority Data

Nov. 5, 1968 Sweden ....................15002/68

[52] U.S. Cl. ....................179/84 VF
[51] Int. Cl. ....................H04m 1/50
[58] Field of Search ....................179/84 VF

[56] References Cited

UNITED STATES PATENTS 3,424,870 1/1969 Breeden et al....................179/84 VF
3,454,726 7/1969 Gasser ....................179/84 VF X

FOREIGN PATENTS OR APPLICATIONS 1,130,475 5/1962 Germany

*Primary Examiner*—Kathleen H. Claffy
*Assistant Examiner*—William A. Helvestine
*Attorney*—Hane & Baxley

[57] ABSTRACT

In an automatic telephone system a subscriber's instrument has a key set and voice-frequency signal transmitter for the sending of different signals through the subscriber's line to receivers in a telephone exchange. For the initiation of a voice-frequency signal and starting of the said transmitter and for marking the release of the pressed key a pnpn-diode is connected in the line loop each time a voice-frequency signal is sent.

2 Claims, 1 Drawing Figure

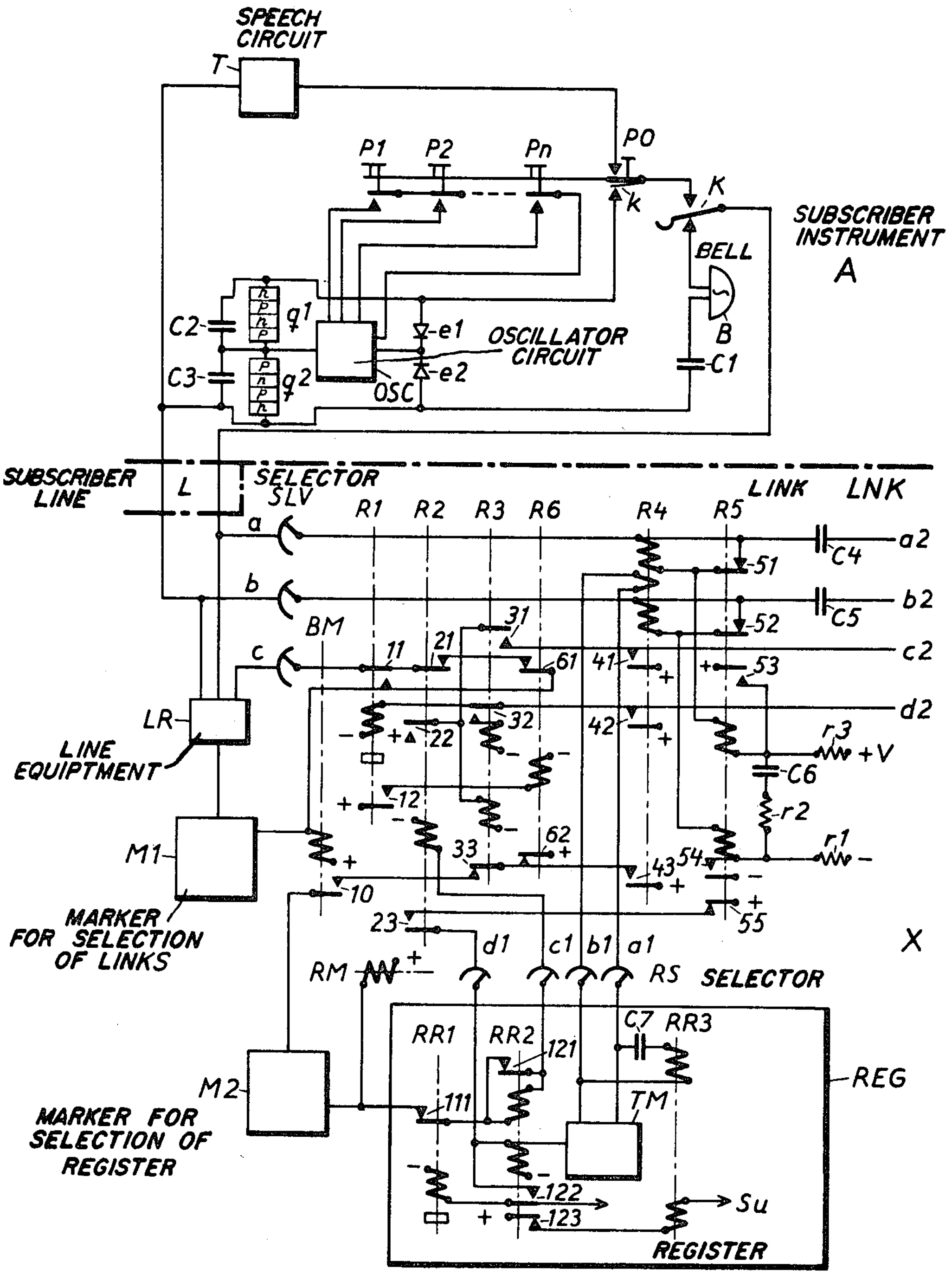
INVENTOR
NILS HERBERT EDSTRÖM
BY Hane and Baxley
ATTORNEYS

ARRANGEMENT FOR VOICE-FREQUENCY SIGNALLING IN TELEPHONE SYSTEMS

In automatic telephone systems the dial of the subscriber's instruments is replaced more and more by a key set and a voice-frequency signal transmitter. The telephone exchange is equipped with voice-frequency signal receivers and the voice-frequency signal transmitter of the subscriber's instrument is started at each voice-frequency signal by closing a direct current circuit containing a direct current source in the telephone exchange, the subscriber's line, the key set and the voice-frequency signal transmitter.

In such connecting means there are difficulties in preventing disturbances caused by acoustic signals which are received by the speaking means of the subscriber's instrument. It is known to prevent disturbances by disconnecting the speaking means of the subscriber's instrument when the key set is operated, and sending simultaneously a particular signal from the subscriber's instrument to the telephone exchange for activating the voice-frequency signal receiver only when one button of the key set is depressed. This invention refers to a new and improved way of carrying out this signal transmission and also for causing the connecting means to be independent of the current direction through the subscriber's instrument. The signal transmission can also be used to connect a register to a completed telephone communication.

The invention is characterized by the utilization of a PNPN-diode which for each voice-frequency signal is connected by means of the key set of the subscriber's instrument in the direct current circuit of the voice-frequency signal transmitter, and by a relay means arranged in the telephone exchange. The relay means is actuated when a current interruption arises in the direct current circuit, on one hand upon disconnection, on the other by the connection of said PNPN-diode and which produces an increase of the voltage of the direct current circuit sufficiently high to have the blocking layer of the PNPN-diode broken through and the diode conduct, in which case the relay means is restored and the voltage increase is disconnected, and by contacts which are actuated by said relay means and which close a circuit for activation of the voice-frequency signal receiver of the telephone exchange only during a time interval that is adapted to a voice-frequency signal transmission, whereby disturbances caused by acoustic signals are avoided.

The invention will be described below with reference to the accompanying drawing.

In the FIGURE, A is a subscriber's instrument, L a subscriber's line and X-part of a telephone exchange. The subscriber's instrument contains speaking and signalling means comprising a speech circuit or speaking means T, a voice-frequency oscillator OSC and a key set consisting of a number of pushbuttons P1–P*n* and a switch contact *k* common to these, which contact is actuated as soon as one of the pushbuttons P1–P*n* is pressed. A pushbutton PO for activation of only the switch contact *k* is also shown in the drawing. Furthermore there is a bell B, a capacitor C1 and a cradle switch K. When the handset of the subscriber's instrument is lifted, the switch K switches the one speaking branch from the bell B to the speaking and signalling means of the instrument. The oscillator OSC is connected in a rectifier bridge consisting of two rectifiers e1 and e2 and two PNPN-diodes *q*1 and *q*2, one for each current direction through the line L.

In the telephone exchange X there are provided a line equipment LR belonging to the subscriber's line L, a link LNK with a relay equipment R1–R6 and furthermore a register REG. To the link LNK belongs a selecting device SLV which by means of a marker M1 connects the link to the line L upon a call from the subscriber's instrument A. To the register REG belongs a selector RS which by means of a marker M2 connects the register REG to the link LNK upon a call from the link. In the register REG there are a voice-frequency signal receiver TM and relays RR1–RR3. Only those relays and circuits which are essential to the invention are shown. The selecting devices SLV and RS consist of crossbar switches with operating magnets BM and RM respectively.

In order to absorb voltage peaks, arising when the relays R4 and R5 of the link LNK are connected and disconnected, there are found on one hand the capacitors $C_2$ and $C_3$ in the subscriber's instrument which capacitors protect the diodes *q*1 and *q*2, and on the other hand a capacitor $C_6$ and resistances *r*1, *r*2, *r*3 in the link LNK. In the telephone exchange X, an auxiliary battery with the voltage +V according to the FIGURE is provided in addition to the common exchange battery. Upon a call from the subscriber's instrument A, the switch K is operated. A circuit is closed from the line equipment LR through the line L, the cradle switch K, the switch contact *k* and the speech circuit T. Relays in line equipment LR are operated. The marker M1 is operated from LR, so that a free link LNK is selected and connected to the line L by means of the selecting device SLV. This causes the operating magnet BM to operate and be held after the operation by a circuit passing from +, through the winding of magnet BM, the contacts 61 and 21, the contact in SLV, the *c*-wire, a relay in LR, to negative. Marker M1 is released. The contact 10 is closed. The marker M2 is operated by a circuit passing through the contacts 10, 33 and 62, whereby a free register REG is selected and is connected to the link LNK by means of a selecting device RS, the operating magnet RM of which is operated from marker M2. Then magnet RM is held in a circuit passing from +, through the winding of the operating magnet RM, the contacts 111, 121, RS, the wire *c*1, the winding of the relay R2, to negative. The relay R2 operates, the contacts 21–23 are actuated. The relay R3 is energized by its lower winding. The contacts 31, 33 are actuated and R3 is held by current through its upper winding and the contacts 32 and 42. The marker M2 is released. During the time before the connection of the register REG, the relays R5, R4 and R1 operate. The relay R5 operates in the following circuit: +V, *r*3, the upper winding of R5, the contact 51, SLV, the *a*-wire, K, *k*, T, the *b*-wire, SLV, the contact 52, the lower winding of R5, *r*1, to negative. The contacts 51–55 are actuated. The relay R4 operates and influences the contacts 41–43 when the contacts 51–52 are actuated. The relay R1 operates, when the contact 42 closes. The contacts 11–12 close. The relay R6 operates. The contacts 61–62 are actuated. The voltage of the exchange battery is connected to the subscriber's instrument through the contacts 53 and 54. The calling subscriber hears the dial tone S*u* which is induced from the coil RR3 in the register REG to the relay coil of R4 via the wires *a*1, *b*1, the selector RS and the capacitor C7. The voice-frequency receiver TM is not affected by the dial tone S*u*.

The subscriber then sends digital signals to REG by means of the pushbuttons P1–P*n*. As soon as a pushbutton, for example P1, is pressed, the common switch contact *k* is actuated, simultaneously as the oscillator OSC is prepared to oscillate with a certain frequency corresponding to the pushbutton. The following circuit is completed: +, the contact 53, the upper winding of R5, the upper winding of R4, SLV, *a*, K, *k*, *e*1, OSC, *q*2 and C3, *b*, elements SLV, the lower winding of R4, the lower winding of R5, the contact 54, to negative. The capacitor C3 is charged to the voltage of the exchange battery but the blocking layer of the PNPN-diode *q*2 is not broken through by this voltage and consequently there will be a disconnection of the battery supply circuit. The relays R4 and R5 release their armatures. The contacts 41, 42, 51–55 are restored. The auxiliary battery +V is connected in series with the exchange battery, whereby the voltage of the diode q2 is increased, so that its blocking layer is broken through and q2 becomes conducting. The oscillator OSC starts oscillating. A voice-frequency signal is sent through the subscriber's line L, is transformed in the coil R4 and is applied to the voice-frequency receiver TM. The capacitor C3 is discharged. When the contact 55 is closed, the voice-frequency receiver is activated, so that the voice-frequency signal is received. The activation is carried out by means of a circuit passing from +, through the contacts 55 and 23, *d*1, RS, the lower winding of the relay RR2, to negative. Simultaneously as receiver TM is activated, the relay RR2 operates. The contacts 121–123 are actuated. The dial tone S*u* is disconnected and relay RR2 is held by current through its upper winding. The winding of the relay RR1 becomes energized by the contact 122. The relay RR1 is however slow to operate and has no time to operate previous to the relay R5 which is again operated when the PNPN-diode *q*2 becomes current-carrying. Also the relay R4 operates again. The battery supply loop through the windings of the relays R4 and R5 and the oscillator OSC is then closed as long as the pushbutton P1 is pressed, since the PNPN-diode *q*2 remains current-carrying. The voice-frequency signal from OSC remains on the line but the voice-frequency receiver TM is blocked when the contact 55 opens. When button P1 is released, the current through oscillator OSC is interrupted but the battery supply loop is instead connected through the speaking means T and for this reason the relays R4 and R5 remain in operative condition. The blocking layer of the diode q2 is built up again.

Each time a pushbutton P1–P*n* in the key set is pushed, a voice-frequency signal is sent to the register REG. Each voice-frequency signal is supposed to correspond to a digit in a subscriber's number and when the necessary digits have been registered in the register a telephone communication is set up by means of means not shown in the FIGURE. When the communication is completed, the register is released by operation of the relay RR1. The contact 111 is actuated, and elements RM, RR2 and R2 release. Thus a telephone communication is assumed to exist between subscriber's instrument A and a called line via the capacitors C4, C5 and the wires *a*2, *b*2. The relay R3 is held operated during the conversation.

Even after a telephone communication has been set up it may be necessary to send signals from the calling subscriber's instrument A, in the form of voice-frequency signals as well as in the form of pulses consisting of short current interruptions which are not accompanied by a voice-frequency signal. By means of the additional pushbutton PO pulses can be produced without sending simultaneously a voice-frequency signal. By means of the relays R4 and R5 in the link LNK a pulse is repeated each time a pushbutton in the key set is pressed. Two signal wires *c*2 and *d*2 are provided in link LNK. On the wire *d*2 each pulse is marked by means of the contact 42. On the wire *c*2 a pulse is marked by means of the contact 41 only when the register REG is not connected. The wires *c*2 and *d*2 are assumed to lead to a relay means which can be designed according to varying conditions and from which signals to link LNK can be transmitted. If wire *c*2 is connected to + in said relay set, for example R3 is held operated by its lower winding and the contact 31, so that pulses can be sent on wire *d*2 without connecting register REG. If the wire *c*2 is not connected to +, the relay R3 releases when a pulse is marked by the relay R4. After the termination of the initiating pulse the marker M2 is actuated by a circuit containing the contacts 43, 33 and 10, so that a register is connected to link LNK. Then register REG can be set by means of voice-frequency signals for special purposes such as information calls, conference calls, connections to an engaged line or the like. The initiating pulse is suitably carried out by means of the button PO, so that a voice-frequency signal is not sent to the called subscriber.

Disconnection of an established telephone connection occurs when the cradle switch K is restored to the position shown in the FIGURE, the DC circuit through the subscriber's line L being permanently interrupted. The relays R4, R5, R1, R3, R6 release. The operating magnet BM releases during the release time of relay R6.

The invention is of course not limited to the above-mentioned embodiment. Thus the PNPN-diodes can be replaced by other equivalent semiconductor components or discharge valves, and the relay means in the telephone exchange can be replaced by electronic components.

I claim:

1. In an automatic telephone system, the combination comprising: at least one subscriber instrument, said subscriber instrument including first and second terminals, a speech circuit having an input terminal and an output terminal, one of said terminals of said speech circuit being connected to said first terminal, a series circuit including at least one PNPN-diode and a voice-frequency transmitter, one end of said series circuit being connected to said first terminal, a key set including at least one key-operated switch which normally connects said second terminal to the other terminal of said speech circuit and when operated connects said second terminal to the other end of said series circuit; a subscriber's line pair connected to said terminals of said subscriber's instrument; and a telephone exchange comprising at least two terminals connected to said subscriber's line pair, a voice-frequency receiver, a relay means actuated for a given period of time when said key-operated switch is operated, said relay means including means for transmitting to said subscriber's instrument a voltage surge when said relay means is actuated, said voltage surge being sufficient to cause said PNPN-diode to conduct and remain conducting until said key-operated switch is released and said relay means further including means for connecting said voice-frequency receiver to said terminals of said exchange during said given period of time.

2. The combination of claim 1 wherein said series circuit comprises a four-leg bridge circuit including two rectifiers and two PNPN-diodes said voice-frequency transmitter being connected across a diagonal of said bridge circuit, and said PNPN-diodes and said rectifiers being so polarized that current can flow in either direction via said voice-frequency transmitter through said series circuit.

* * * * *